United States Patent [19]

Takamura et al.

[11] 4,291,337

[45] Sep. 22, 1981

[54] ELECTRIC CHARGE TRANSFER APPARATUS

[75] Inventors: Tooru Takamura, Takatsuki; Sumio Terakawa, Ibaraki; Hirokuni Nakatani; Izumi Murozono, both of Takatsuki, all of Japan

[73] Assignee: Matsushita Electronics Corporation, Osaka, Japan

[21] Appl. No.: 77,262

[22] Filed: Sep. 20, 1979

[30] Foreign Application Priority Data

Sep. 27, 1978 [JP] Japan .................... 53-119588

[51] Int. Cl.³ ............................................. H04N 5/30
[52] U.S. Cl. .................................. 358/213; 358/167; 250/211 J
[58] Field of Search ............... 358/166, 167, 212, 213, 358/285; 357/24, 30; 250/211 J, 578

[56] References Cited

U.S. PATENT DOCUMENTS

| | | | |
|---|---|---|---|
| 3,824,337 | 7/1974 | Sangster | 358/213 |
| 3,919,469 | 11/1975 | Kasperkovitz | 358/213 |
| 3,946,151 | 3/1976 | Kamiyama | 358/213 |
| 4,001,501 | 1/1977 | Weimer | 250/211 J |
| 4,055,836 | 10/1977 | Weimer | 358/213 |
| 4,067,046 | 1/1978 | Nakatani | 358/213 |
| 4,079,422 | 3/1978 | Anagnostopoulos | 358/213 |
| 4,082,963 | 4/1978 | Hoffman | 357/24 |
| 4,100,513 | 7/1978 | Weckler | 357/24 |
| 4,145,721 | 3/1979 | Beauduoin | 358/213 |
| 4,157,558 | 6/1979 | Weckler | 357/24 |
| 4,189,749 | 2/1980 | Hiroshima | 358/213 |

Primary Examiner—Jin F. Ng
Assistant Examiner—Michael A. Masinick
Attorney, Agent, or Firm—Stevens, Davis, Miller & Mosher

[57] ABSTRACT

In an electric charge transfer apparatus, first capacitance elements have the one end grounded and the other end connected to a first main electrode of a field effect transistor. Second capacitance elements have the one end grounded and the other end connected to a second main electrode of the field effect transistor. Third capacitance elements have the one end connected to the second main electrode of the field effect transistor and the other end connected to a transfer auxiliary pulse application terminal. Switch element have the one end connected to the second main electrode of the field effect transistor and the other end connected to a voltage source. A transfer pulse application terminal is connected to a control electrode of the field effect transistor.

8 Claims, 8 Drawing Figures

ELECTRIC CHARGE TRANSFER APPARATUS

This invention relates to a method for transferring information related to a variation of electric charges periodically into one direction, and more particularly to an electric charge transfer method which, when the quantity of electric charge stored in a large capacitor is varied a lttle by charging or discharge for a unit time, transfers only this variation of electric charge into a capacitor having a value much smaller than that of the above capacitor as rapidly and efficiently as possible and repeats this transfer operation effectively.

Hereinafter, with reference to a solid state light image detecting apparatus of MOS type, the necessity of the electric charge transfer method according to this invention together with the influence of the transfer efficiency on the imaging effect will be explained.

Figure 1:
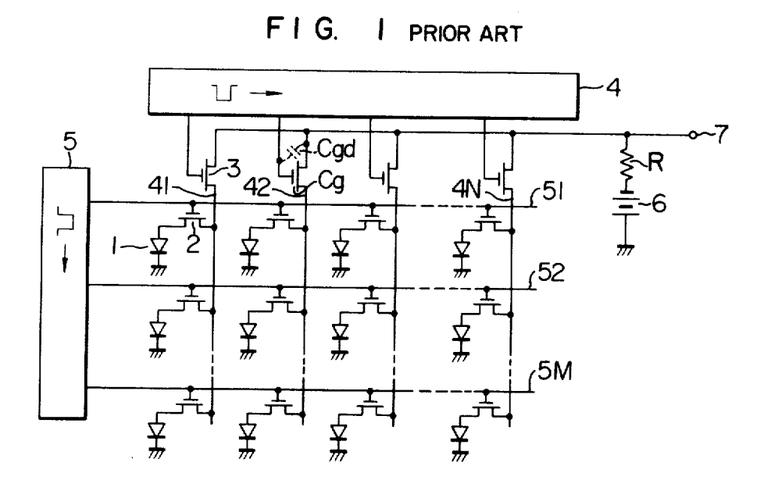
FIG. 1 is a circuit diagram of the conventional two dimensional light image detecting apparatus of MOS type.

FIG. 1 shows the structure of a two-dimensional light image detecting apparatus of solid state MOS type according to one embodiment. The circuit construction consists of M row-N column disposition of a number of unit picture elements formed by a photodiode 1 (hereinafter referred to as P. D.), or a light detecting element, and a vertical switching element (hereinafter referred to as VMOST) 2 connected thereto. The basis is in the sampling operation using a horizontal switching element (hereinafter referred to as HMOST) 3, a horizontal scan pulse generating means 4, and a vertical scan pulse generating means 5.

Next, the operation of a unit picture element disposed at an intersection of the first row and the first column will be explained. In FIG. 1, when the vertical scan pulse generating means 5 makes VMOST2 conductive by way of the first row bus 51 and further the horizontal scan pulse generating means 4 makes HMOST3 in the first column conductive, the output signal, or the video signal, appearing at an output terminal 7 is given by a charging current which is charged in the junction capacitance of P.D1 through a resistor R, HMOST3 and VMOST2 toward substantially the same electric potential as that of a power source 6. Meanwhile, this charging current compensantes the electric charge discharged by P.D1 during one scan period due to the incident light. Hence, the current is proportional to the intensity of incident light. When the columns 41, 42 . . . 4N and the rows 51, 52 . . . 5M are sequentially and selectively scanned, a video signal is obtained at a P.D1 at each intersection due to the effect of logical product of switching elements, VMOST2 and HMOST3. This signal is detected as a terminal voltage across the output load resistor R.

However, the above method of direct scan of the P.D1 to read out the signal (hereinafter referred to as P.D.S. method) has the following problems.

(1) If the circuit of FIG. 1 is embodied by using the usual MOS type semiconductor integrated circuit technique, the connection part of VMOST2 with the column bus 41, i.e. the drain region of VMOST2, forms a pn junction with the substrate. Therefore, with increase of the number of picture elements in the row and the column, the number of drains connected to the column bus 41 increases. So, the addition of the capacitances of M drain junctions makes the capacitance of the column bus a large value. Furthermore, under the condition of the conventional television imaging (NTSC system), one horizontal scan period is made to have a value of the order of 60 μsec. If a lot of picture elements (e.g. about 300) are to be scanned, the effective scan time for reading out P.D in each column becomes smaller with increase of the number of picture elements. When the video signal in the P.D1 is for example read out in a short time, the reading-out speed is decreased due to a large time constant of the circuit formed by the resistance component of VMOST2, the large capacitance of the column bus 41 and the resistance component of HMOST3. Thus, a part of the video signal of P.D1 to be read out at the video terminal 7 is left in the large capacitance of the column bus 41, before the scanning of the following column begins. Since the signal left in the column bus 41 is mixed into the video signal of the succeeding column, the light image obtained by this light image detecting apparatus has a poor resolution.

(2) The maximum quantity of electric charge capable of being derived from P.D as a video signal is determined by a product of the junction capacitance of P.D and the charging voltage. According as this product is larger, the usable range against the incident light of the light image detecting apparatus (dynamic range) increases. Therefore, it is desirable that the charging voltage of P.D is as large as possible. Namely, as apparent from FIG. 1, since the charging voltage is determined by the voltage of power source 6, it is preferable to increase it. On the other hand, in order to introduce a small signal of P.D1 to the video terminal 7, due to a general property of MOS transistor (hereinafter referred to as MOST), the horizontal scanning pulse voltage applied to the gate of HMOST3 should be larger than the voltage $V_S$ of the charging power source by the threshold voltage ($V_T$) of MOST; say, the pulse height should be larger than $V_S+V_T$. However, the scanning pulse can cause spike-like noise on the video signal line 7 through the gate capacitance $C_g$ of HMOST3 and the gate-drain parasitic capacitance $C_gd$ thereof, and deteriorates the quality of video signal. So, it is not possible, in the method of FIG. 1, to increase without limit the charging voltage of P.D1 only for the purpose of increasing the dynamic range.

This invention aims to solve the above-mentioned problems. Detailed explanation of the invention will be made hereinafter with reference to an embodiment.

Figure 2:
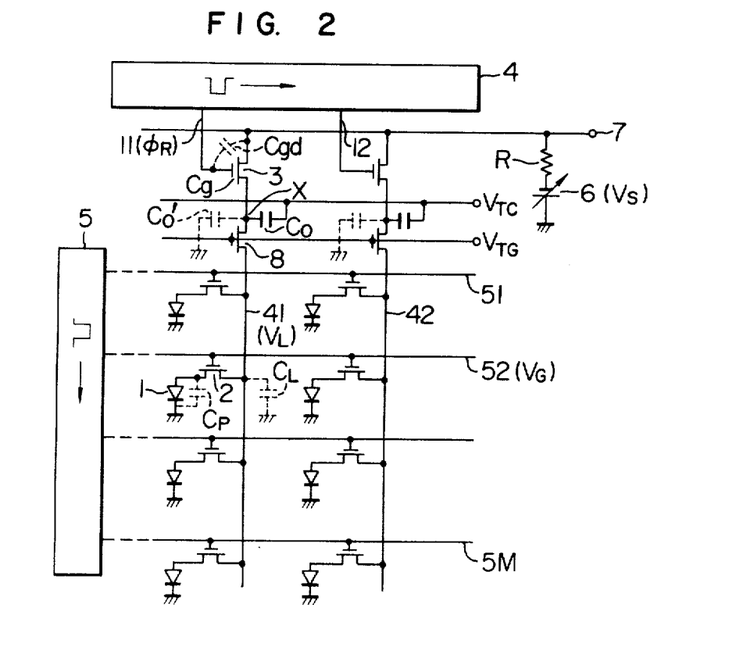
FIG. 2 is a circuit diagram of a two dimensional light image detecting apparatus comprising charge transfer according to one embodiment.

These and other objects, features and advantages of this invention will be apparent from the following description taken in conjunction with the accompanying drawings, in which:

FIG. 2 shows the construction of a two dimensional solid state light image detecting apparatus which performs the transfer of electric charge signal by the inventive charge transfer method.

This apparatus basically comprises a light detecting part with many rows and many columns; a transfer part for transferring the video signal obtained by the detecting part into the upper horizontal scan part for each horizontal scan line with a proper row correspondence; and a scan circuit part for reading out sequentially and selectively the transferred light information for one horizontal scan. The light detection part, the transfer part and the scan circuit part are formed in one united body in the same semiconductor substrate. The charge transfer method of this invention is applied to the above transfer part.

In order to realize the above-mentioned apparatus, it is preferable to employ the MOS LSI technique which allows high integration relatively easily and united construction of the parts.

In practice, a number of picture elements consisting of a light detecting means P.D1 and VMOST2 connected to P.D1 are disposed in a matrix of M row-N column. For the purpose of explanation, 4 row-2 column disposition is demonstrated in FIG. 2. In the actual integrated circuit, P.D1 utilizes the source junction of VMOST2 so that each P.D has a junction capacitance $C_p$. Furthermore, since all the M VMOST2 belonging to each column connect their drain junctions to the corresponding column buses 41, 42 . . . respectively, each column bus has a capacitance $C_L$ which is much larger than the capacitance $C_p$ of individual P.D1. Vertical scan pulses $V_G$ generated from top to bottom in the order of 51, 52 . . . 5M by the vertical scan circuit are applied to the gate of VMOST2 on the corresponding column. Each column bus 41 forms a signal transfer part comprising a transfer MOST (hereinafter referred to as TR-MOST) 8 and a transfer condenser $C_o$ between the bus 41 and HMOST3 corresponding to this bus. We assume that a voltage $V_L$ is applied at each column bus. A transfer pulse $V_{TG}$ is applied to the gate of each TR-MOST8 connected in common. A transfer auxiliary pulse $V_{TC}$ is applied to a connection point X at the drain of TR-MOST8 through a transfer condenser $C_o$. The point X is connected to the source of HMOST3, forming a parasitic capacitance $C_o'$ with the semiconductor substrate. Scan pulse $\phi_R$ generated by the horizontal scan circuit 4 from left to right are applied to the gate of HMOST3 through scan lines 11, 12 . . . . The drain of HMOST3 is connected to the video output line 7, which is grounded to the substrate through a load resistor R and a video power source 6 with a voltage $V_S$. The parasitic capacitance between the gate and the drain of HMOST3 is denoted by $C_gd$ while the gate capacitance is denoted by $C_g$.

Figure 3:
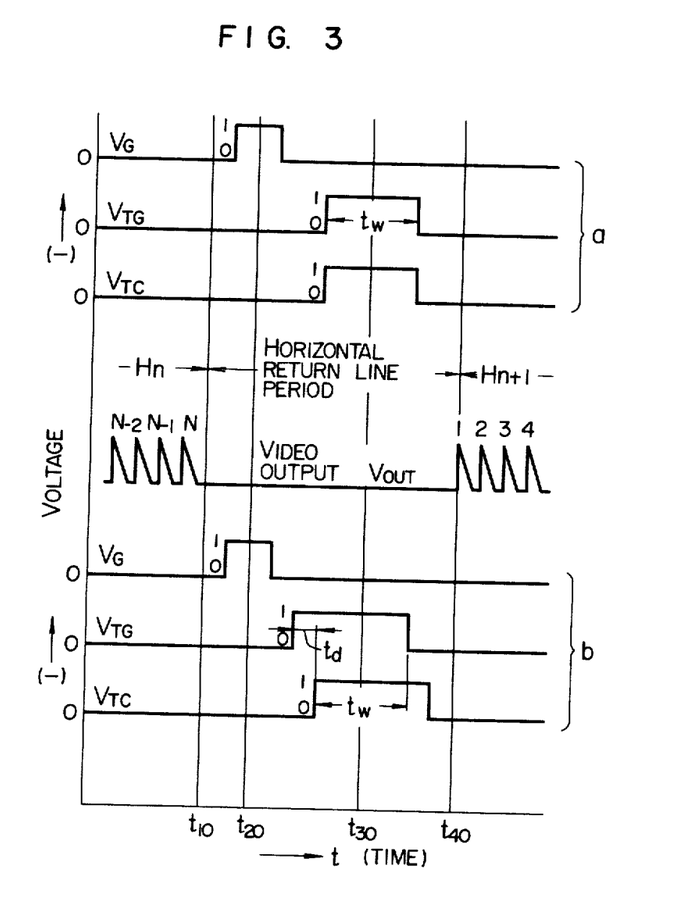
FIG. 3 is a diagram of timing for driving the transfer circuit of FIG. 2.

FIG. 3 is diagram of timing for the explanation of the driving method of the two-dimensional solid state light image detecting apparatus shown in FIG. 2. Wave forms of the main pulses necessary for the drive together with the output wave form are shown. Although all MOST's are assumed to be P channel enhancement type, the same principle applies to the N channel type. Since the functions of all the picture elements are the same attention will be paid only to the group of picture elements disposed in parallel on the first row. The following explanation is based on the publicly known fundamental operation as shown in FIG. 1. First, the operation of the apparatus shown in FIG. 2 will be explained by the basic pulse wave forms of FIG. 3 in order to show the advantage of this invention comprising the charge transfer. Next, the transfer method of this invention will be explained by the pulse wave form of FIG. 3.

A simple case of reading out the video signal of P.D1 which discharges completely by the incident light during a period of one frame will be explained next with reference to FIG. 2 and FIG. 3. If the voltage of the column bus 41 is charged at $V_L$ at a time $t_{10}$ in the horizontal return line period, application of a gate voltage $V_G$ to VMOST2 of the row bus 52 at a time $t_{20}$ charges P.D1 again from zero to about $V_L$ because of the relative $C_p << C_L$. This means that the electric charge given by $C_p \cdot V_L = Q_p$ has flown into P.D1 from the column bus 41. In another word, almost all the light information corresponding to the incident light received by P.D1 during one frame has moved from P.D1 to the column bus 41 in the form of a deficiency of electric charge $-Q_p$. This means that charging in one direction (transfer of electric charge) is equivalent to the transfer of information in the opposite direction.

The light information $-Q_p$ transferred to the column bus is transferred to a connection point X by the action of both TR-MOST8 and the transfer condenser $C_o$ at a time $t_{30}$. at a time $t_{40}$, when the horizontal scan period begins, the light information $(-Q_p)$ stored in each connection point X is neutralized by the power source 6 after being conducted through HMOST3 sequentially. The current flowing at that moment is detected by the load resistor to yield a video signal at the terminal 7 (Hereinafter this method will be referred to as H.T.S. method). A more detailed description of the above transfer method will be given here. The voltage at each connection point X at $t_{10}$, when the horizontal scan is finished, is equal to $V_S$ of the charging power source 6. However, at the transfer time $t_{30}$, a negative pulse voltage $V_{TC}$ is applied to the drain of TR-MOST8 through the condenser $C_o$, while a negative pulse voltage $V_{TG}$ is applied to the gate of TR-MOST8. So, the voltage $V_X$ at the connection point is given by $$V_X = V_S + \frac{C_o}{C_o + C_o'} \cdot V_{TC} \tag{1}$$

which is a large minus voltage. The voltage $V_L$ of the column bus 41 is always charged to $V_L = V_{TG} - V_T$ through TR-MOST8 due to the saturation characteristic of MOST. Due to the fact that the column bus 41 is always charged to the same voltage by the momentally large negative voltage, the defficiency of electric charge $-Q_p$ on the column bus 41, if any, is neutralized by charging to $V_L$. On the contrary, a defficiency $-Q_p$ appears at the connection point X. As a result, a light information $(-Q_p)$ is equivalently transferred from the column bus 41 to the connection point X. Furthermore, when $V_{TG}$ and $V_{TC}$ return to the zero potential, TR-MOST8 is cut off. At the same time, due to the disappearance of the voltage component of the second term of eq. (1), the voltage $V_X$ becomes smaller than $V_S$ by a value corresponding to the light information $(-Q_p)$, whereby the light information is stored in the capacitance $C_o + C_o'$ at the connection point. Throughout this text, the ratio of the information transferred to $C_o + C_o'$ to the information in the column bus capacitance $C_L$ will be denoted as the transfer efficiency $\eta$, and the fraction of information left in $C_L$ will be denoted as the transfer loss $\epsilon$. In order that the charge transfer occurs effectively, it is necessary that, even after the voltage $V_L$ of the column bus 41 is charged to $V_{TG} - V_T$, the voltage $V_X$ should be much larger in the negative direction than $V_L$, during the period when the transfer pulse $V_{TG}$ is being supplied, say $|V_X| > |V_L|$. Therefore, the minimum voltage of $V_{TC}$ should satisfy, because of eq. (1) and $V_L = V_{TG} - V_T$, $$V_{TC} > \frac{C_o + C_o'}{C_o} \cdot \{V_{TG} - (V_T + V_S)\} \qquad (2)$$

Furthermore, in order that the light information $-Q_p = -C_p \cdot V_L$ at an individual P.D be stored as a defficiency of electric charge at the connection point X, the relation $Q_p < (C_o + C_o') V_S$ should be satisfied. So, we have as a necessary condition $$V_L < \frac{C_o + C_o'}{C_p} \cdot V_S \qquad (3)$$

If we compare the solid state light image detecting apparatus (H.T.S. method) of FIG. 2 with the apparatus of FIG. 1 (P.D.S. method), following merits will be remarked.

(1) In the H.T.S. method, since the light information on one row is transferred simultaneously to the upper connection points X utilizing the horizontal return line period (about 10 μsec) which has a relatively long period, the time constant for the reading out the video signal in the horizontal scan period is neither influenced by the resistance component of VMOST2 nor a large capacitance $C_L$ of the column bus 41. It is sufficient to read out sequentially the information stored in the capacitance at the connection points X $(C_o+C_o'<<C_L)$ through the resistance component of HMOST3. The reading out speed is thus largely improved compared to that of P.D.S. method. Thus, only if a sufficient transfer efficiency is good, the percentage of the signal left unread is negligible and, hence, the resolution in horizontal and vertical directions can be largely improved.

(2) In the H.T.S. method, since the charging voltage $V_L$ of P.D is not given by $V_S$ but $V_L = V_{TG} - V_T$, that is, determined by the applied pulse voltage $V_{TG}$, even with the limitation of eq. (2), $V_L$ can be about 15 times as large as $V_S$. Thus, for a power source with $V_S = -2$ V the charging voltage of P.D may be made $V_L = -30$ V. As described above with reference to FIG. 2, as the horizontal scan pulse voltage which can cause spike-like noise can be decreased to $-4$ to $-6$ V($\cong V_S + V_T$) and, moreover, the charging voltage applied to P.D can be made sufficiently large, a light image detecting apparatus with low noise and a large dynamic range can be obtained.

In order to understand the merits of the transfer method of H.T.S. systems, the following discussion will be restricted to a case when the voltage $V_L$ is sufficiently larger than $V_S$ in the negative direction. That is, only if the transfer efficiency is good, the H.T.S. method is superior to the P.D.S. method in all respects. However, in the above explanation, the transfer pulses $V_{TG}$ and $V_{TC}$ have the same phase as in the usual BBD transfer, as shown in FIG. 3a. In practice, transfer with a pulse width of the order of horizontal return line period (tw ≈ 10 μsec) gives a transfer efficiency of about 10%. So, any effect expected from H.T.S. method can not be obtained. However, with use of the transfer method of this invention, in which the transfer pulse $V_{TC}$ is made to lag behind $V_{TG}$ by td (>20 nsec), the transfer efficiency η increases at once up to 65 to 95%, and a remarkable effect or improvement on the characteristic of the solid state light image detecting apparatus is obtained as expected from the H.T.S. method.

Hereinafter, a comparison will be made between the method using the transfer pulse as shown in FIG. 3a (referred to as N.B. method here) and the method of this invention using the transfer pulse as shown in FIG. 3b (here referred to as S.B. method here). A qualitative explanation will be made of a remarkable improvement on the transfer efficiency in the S.B. method.

Figure 4A:
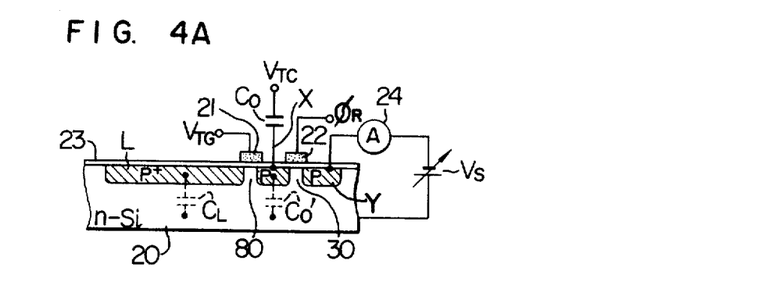
FIGS. 4A to 4C show the structure, the potential and the timing of the conventional transfer method.
Figure 4B:
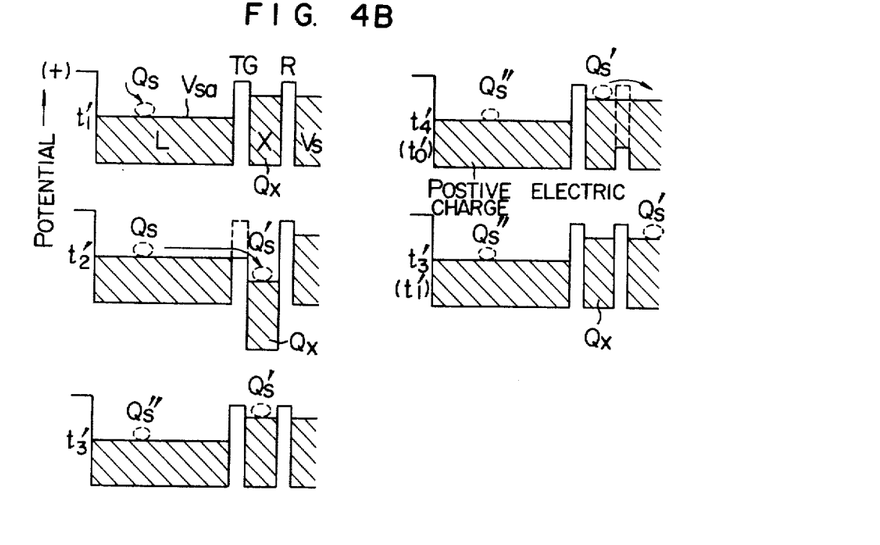
Figure 4C:
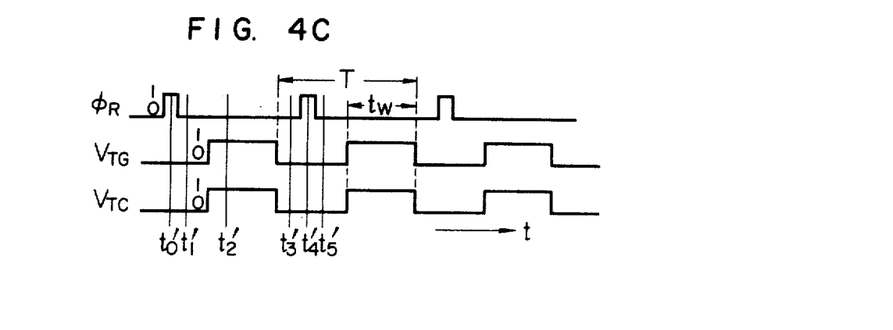

FIGS. 4A to 4C are drawings for a detailed explanation of the N.B. method. FIG. 4A shows an actual semiconductor structure of the transfer part of FIG. 2. In order to understand the operation well, a model cross-sectional view of P channel is drawn. The correspondence between FIG. 2 and FIG. 4A is as follows. For the column bus 41, a P type region L having a large capacitance $C_L$ is formed on the n type semiconductor substrate 20. Transfer pulses $V_{TG}$ and the horizontal scan pulse $\phi_R$ are applied through gate metal films 21 and 22. MOST80 and MOST30 are formed in correspondence with TR-MOST8 and HMOST3 respectively. A connection part between these MOST's, i.e. a p type region X, has a junction capacitance $C_o'$. The transfer pulse $V_{TC}$ is applied through the condenser $C_o$. To the p type region Y of MOST30 is applied a negative voltage $V_S$ with respect to the semiconductor substrate 20 through an ammeter 24.

Before the explanation of FIGS. 4B and 4C, general equations holding for transfer MOST in the period of operation are given for the model of FIG. 4A.

(1) The voltage of drain X of MOST80 becomes sufficiently large negative by the application of pulse $V_{TC}$. This forces MOST80 to operate in the saturation region. So, the current $I_c$ flowing from the drain X to the source L is given by $$I_c = -\frac{\beta}{2}(V_{TG} - V_L - V_T)^2, \qquad (4)$$

where β is a gain constant of MOST80.

(2) The voltage $V_{sa}$ of the source L in the case when the pulse application time of the transfer pulses $V_{TG}$ and $V_{TC}$ is sufficiently long and MOST80 is completely saturated, is $$V_{sa} = V_{TG} - V_T. \qquad (5)$$

(3) The actual transfer operation is repeated with a pulse width tw. Here, in order to give a temporal picture of transfer operation, only a general equation of the instantaneous voltage $V_A$ of the source L with respect to $V_{sa}$ is given as $$V_A = V_o \left[ 1 + \frac{\beta V_o tw}{2C_L} \right]^{-1}, \qquad (6)$$

where $V_o$ is the initial voltage of the source L with respect to $V_{sa}$.

(4) The initial quantity of electric charge corresponding to the light information of the source L, $Q_o = C_L \cdot V_o$, begins to flow by the action of the transfer pulse. A part of signal electric charge, $Q_r$, left in the source L after tw (which corresponds to the information left unread in the source L after transferring) is given by $$Q_r = C_L V_A = Q_o \left[ 1 + \frac{\beta Q_o tw}{2C_L^2} \right]^{-1}. \qquad (7)$$

Here, the initial quantity of electric charge $Q_o$ may be considered simply to be equal to the signal electric charge $Q_s$. However, in a more general case where a bias charge $Q_b$ is introduced during the transfer operation, it is considered that $Q_o = Q_s + Q_b$, where the bias electric charge $Q_b$ is not an arbitrary value varying temporarlly like the signal electric charge $Q_s$ but is a constant electric charge added to $Q_s$ before transferring. The transfer efficiency is influenced by $Q_b$.

(5) Usually, a relation $\epsilon + \eta = 1$ holds between the transfer efficiency $\eta$ and the transfer loss $\epsilon$. Calculation of $\epsilon$ from eq. (7) gives the following value for 68.

$$\epsilon = \frac{Q_r}{Q_o} = \frac{1}{1 + \frac{\beta(Q_s + Q_b)tw}{2C_L^2}} \quad (8)$$

In the image element, the actual value of $Q_s$ is very small so that we may consider $Q_s \approx 0$. In conclusion, a case with $Q_b = 0$ in eg. (8) corresponds to the N.B. method, while a case with introduction of a large bias $Q_b$ corresponds to the S.B. method.

With provision of the above equations, the operation of N.B. method will be explained with reference to FIG. 4C showing the timing of N.B. method and FIG. 4B showing potential diagram. FIG. 4B expresses the potential of FIG. 4A, where the potential is positive in the upper direction and only positive electric charge is treated.

(1) Absence of signal electric charge in the source L:

$t_0'(t_4')$: Application of a horizontal scan pulse $\phi_R$ makes MOST30 conductive and decreases a barrier R. The voltage at X becomes $$V_X = V_S$$

$t_1'$: Disappearance of the horizontal scan pulse $\phi_R$ at $t_1'$ makes MOST30 non-conductive and raises R.

$t_2'$: Simultaneous application of transfer pulses $V_{TG}$ and $V_{TC}$ makes MOST80 conductive and decreases a barrier TG. The whole voltage at X is reduced sufficiently, The voltage at L in this case is a saturated value $V_{Sa}$ limited by TG and any current flow from L to X is prevented.

$t_3'$: Simultaneous disappearance of tranfer pulses $V_{TG}$ and $V_{TC}$ makes the potentials at L and X the same as those at $t_1'$.

$t_4'$: Phenomena at $t_4'$ is the same as those at $t_0'$. No current flows from X to $V_S$. The same cycle is repeated with the potential at L kept always at $V_{Sa}$.

(2) Case when the signal electric charge $Q_s$ is generated at the source L during the transfer cycle T:

$t_0'$: The situation is the same as that in case (1).

$t_1'$: The situation is the same as that in case (1). except that a signal electric charge $Q_s$ is injected into L.

$t_2'$: A small quantity of signal electric charge $Q_s$ stored in the large capacitance $C_L$ passes barely through the barrier TG and flows into X. Due to the transfer time of tw, a transfer loss arises, which, by eq. (8), becomes $$\epsilon = \frac{1}{1 + \frac{\beta Q_s tw}{2C_L^2}} \quad (9)$$

According as the signal electric charge $Q_s$ becomes smaller, $\epsilon$ approaches unity. This is a character inherent to the imaging method comprising electric charge transfer. For a dark picture, $Q_s$ is small and, hence, $\eta$ is small. Thus, the image in the vertical direction becomes obscure.

$t_3'$: The situation is the same as that in case (1) except that the transferred signal electric charge $Q_s'$ ($Q_s = Q_s' + Q_s''$) has moved into X.

$t_4'$: The potential at X returns to $V_S$ due to a drop of R, whereby the signal electric charge $Q_s'$ is detected by a signal detection ammeter 24. The same cycle is repeated, but at $t_1'$ in the next cycle the electric charge $Q_s''$ left in the present cycle is mixed with the newly injected signal electric charge.

Next, using the model of FIG. 4A, the timing diagram of FIG. 5B, and the potential diagram of FIG. 5A, the transfer operation of S.B. method according to this invention will be explained in the same manner as described on N.B. system.

(3) Absence of signal electric charge in the source L:

$t_0(t_6)$: Application of a horizontal scan pulse $\phi_R$ makes, MOST30 contuctive, and reduces R. The voltage at X becomes $V_S$, i.e. $V_X = V_S$.

$t_1$: Disappearance of the horizontal scan pulse $\phi_R$ makes MOST30 non-conductive, and increases R. We assume that the voltage $V_L$ in this case is given by $V_L = V_K$. As described before, in order to maintain the merit of H.T.S. method, the transfer condition is limited to a case where $V_L$ is always sufficiently negatively larger than $V_S$. So, the potential $V_X$ at $t_1$, in the potential diagram is higher than $V_K$.

$t_2$: Only the transfer pulse $V_{TG}$ is applied. MOST80 becomes conductive and $T_G$ drops. Since the electric charge $Q_b$ is injected into L, the potential at X becomes equipotential with L. So, $V_K$ is higher than $V_H$.

$t_3$: The transfer pulse $V_{TC}$ is applied and the while potential at X is decreased sufficiently. The electric charge flows from L to X, i.e. in the opposite direction to that at $t_2$. However, due to the limited transfer time tw, only the electric charge $Q_b$ has flown, before $t_4$ comes. Therefore, the potential at L stops at $V_K$, higher than $V_{Sa}$. The final quantity of electric charge at X returns to $Q_X$ which is equal to the value at $t_1$.

$t_4$: $V_{TG}$ disappears while $V_{TC}$ is being applied. TG increases, and the flow of electric charge between L and X stops.

$t_5$: $V_{TC}$ disappears. The situation becomes the same as that at $t_1$.

$t_6$: The situation becomes the same as that at $t_0$. No electric charge flows from X to the power source with $V_S$.

The same cycle is repeated. It should be noted, in the transfer method (S.B. method) of this invention, the potential at L oscillates between $V_H$ and $V_K$, forcing the electric charge $Q_b$ to make a return movement between L and X, but that no electric charge flows from X to the power source with $V_S$.

(4) Case when the signal electric charge $Q_s$ is generated in the source L during the transfer cycle:

$t_o$: The situation is the same as that at $t_o$ in case (3).

$t_1$: The situation is the same as that at $t_1$ in case (3) except that the signal of $Q_s$ is injected into L.

$t_2$: The situation is the same as that at $t_2$ in case (3) except that a quantity of electric charge $Q_b$ much larger than $Q_s$ is further injected into L.

$t_3$: The situation is substantially the same as that at $t_3$ in case (3) except that the electric charge transferred from L to X is $Q_b + Q_s$, where $Q_b$ acts as the bias electric charge. Thus, the transfer loss in this case is expressed by eq. (8). Now, if $Q_b$ much larger than $Q_S$ is introduced into eq. (8), the transfer loss of S.B. method, $\epsilon_{SB}$, can be made much smaller than that of N.B. method, $\epsilon_{NB}$, obtained from eq. (9). As a result, the transfer efficiency is remarkably improved by the S.B. method. Furthermore, even if the quantity of signal electric charge $Q_S$ is small in eq. (8), $\epsilon_{SB}$ becomes constant independent of $Q_b$. Therefore, the image of a dark picture does not become obscure.

$t_4$: The situation is the same as that at that at $t_4$ in case (3) except that the transferred signal electric charge $Q_S'$ ($Q_S = Q_S' + Q_S''$) has moved into X. The quantity of electric charge at X becomes $Q_X + Q_S'$.

$t_5$: The situation is the same as that at $t_5$ in case (3) except that additional signal electric charge appears at X.

$t_6$: The potential at X returns to $V_S$ due to a drop of R, whereby $Q_S'$ is read out from the signal detection ammeter 24.

The same cycle is repeated. At $t_1$ in the succeeding cycle, the part of $Q_S$ left unread in the present cycle is mixed with the new signal electric charge. However, in the S.B. method, the quantity of mixed $Q_S''$ is extremely smaller than in the N.B. method.

The above description on the transfer operations of both methods can be summarized as follows.

(1) In both methods, conditions given by the relations (2) and (3) are necessary. In order to make the best use of the advantageous operation of the H.T.S method, the charging voltage $V_{Sa}$ or $V_K$ is made to have a value negatively much larger than $V_S$.

(2) While the N.B. method uses the pulse timing shown in FIG. 3A, the S.B. method uses the pulse timing shown in FIG. 3B.

(3) While the N.B. method has no effect of bias electric charge, in the S.B. method, prior to charge transfer, the bias electric charge $Q_b$ is automatically injected from X to L, i.e. in the opposite direction to that of the transfer of signal electric charge.

Figure 5A:
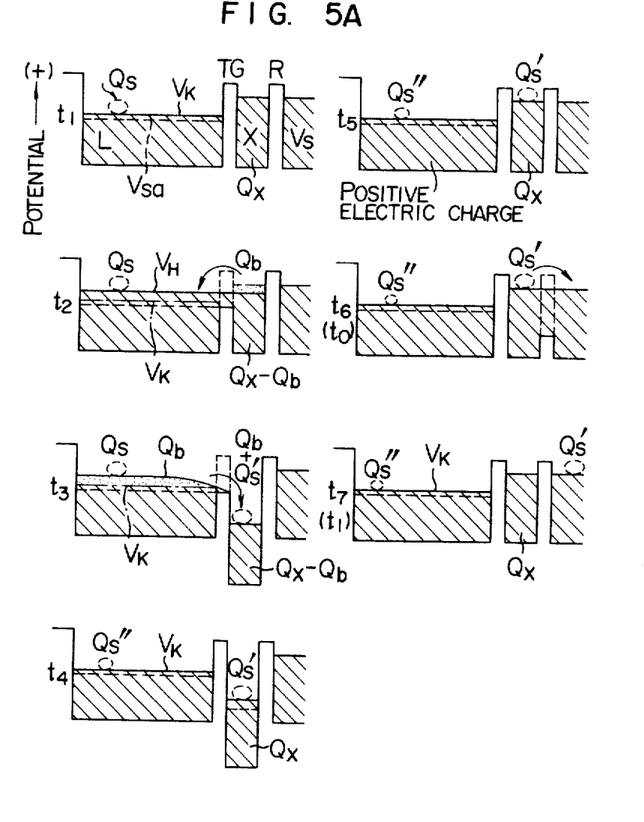
FIGS. 5A and 5B show the potential and the timing for the detailed explanation of the transfer method of this invention.
Figure 5B:
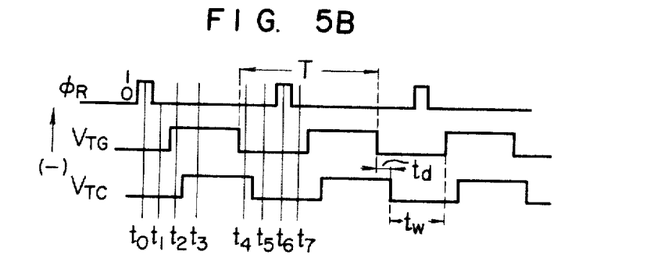

(4) It is seen from the potential diagram at $t_2$ in FIG. 5A that $Q_b \propto V_S - V_K$. According as the difference between the charging voltage $V_K$ and $V_S$ is larger, the value of the bias electric charge $Q_b$ becomes large, and the transfer loss is reduced.

(5) In the S.B. method, the bias electric charge $Q_b$ lost from X makes an efficient transfer of signal electric charge $Q_S$, as evident from eq. (8), and transfer $Q_S'$ into X. However, since $Q_b$ is also transferred, from a view point of a net quantity of electric charge at X, an effective quantity transferred is $Q_S'$.

(6) The enhancement of transfer efficiency by the introduction of bias electric charge $Q_b$ in the case of N.B. method is due to the fact that the basic level of transfer relative to the barrier TG is $V_{sa}$, while in the case of S.B. method due to the fact that the level is raised to $V_K$ which is higher than $V_{sa}$.

(7) In the N.B. method, since the transfer efficiency $\eta$ depends on the quantity of signal electric charge $Q_S$, the image obtained by the application of this method becomes obscure when the light intensity varies. In the S.B. method, since $\eta$ is kept constant through introduction of $Q_b$, the image does not become obscure.

(8) The ratio of transfer losses in both methods (cf. eq. (8) under the usual condition of $Q_b << Q_S$ becomes as follows $$\frac{\epsilon N \cdot B}{\epsilon S \cdot B} = \frac{1 + \frac{\beta(Q_S + Q_b)t_w}{2C_L^2}}{1 + \frac{\beta Q_S t_w}{2C_L^2}} = \frac{1 + \frac{\beta Q_b t_w}{2C_L^2}}{1 + \frac{\beta Q_S t_w}{2C_L^2}} \quad (10)$$

This equation shows how the introduction of $Q_b$ is effective.

Using the H.T.S. method of this invention as described above, a two-dimensional solid state light image detecting apparatus with $254 \times 244$ bits was built. The result showed that while the N.B. method gave a poor transfer efficiency $\eta$ of about 10% and no image, the S.B. method raised $\eta$ up to 65 to 95%. An improvement on the characteristic of the apparatus and a remarkable effect on the clearness of image were appreciated, as expected from the H.T.S. method. A clear image with a vertical resolution of 240 lines was obtained.

Although in the above embodiment the signal electric charge stored in the connection part X was read out by transferring the signal electric charge by the switching action of MOS type transistors, it is needless to say that the signal electric charge may be read out by using another electric charge transfer element.

What is claimed is:

1. An electric charge transfer apparatus comprising a first capacitance element storing signal information, one end thereof being grounded while the other end thereof is connected to a first main electrode of a field effect transistor, said transistor having a control electrode and first and second main electrodes; a second capacitance element, one end thereof being connected to the second main electrode of said field effect transistor; a third capacitance element, one end of said element being connected to said second main electrode of said field effect transistor while the other end thereof is connected to a transfer auxiliary pulse application terminal; switch means having a control input, one end thereof being connected to said second main electrode of said field effect transistor while the other end thereof is connected to a voltage source, and a transfer pulse application terminal connected to the control electrode of said field effect transistor; wherein signal information stored in said first capacitance element is read out as a electrical signal flowing through said switch means when pulses are sequentially applied to said transfer pulse application terminal, switch means control input, and said auxiliary pulse application terminal.

2. An electrical charge transfer apparatus according to claim 1, further comprising means for applying said transfer pulse to a transfer pulse application terminal before applying a pulse to a transfer auxiliary pulse terminal.

3. An electric charge transfer apparatus comprising a group of light detecting elements disposed in first and second columns, each column having a plurality of vertical switching elements, each element having a first main electrode connected to one of said light detecting elements and a second main electrode; vertical scan pulse input lines each connected to control said vertical switching elements for each column; bus lines connecting second main electrodes of said vertical switching elements for each column; field effect transistors having a pair of main electrodes and a control electrode for transferring electrical charge, the first main electrodes of each are connected to each bus line; transfer pulse input lines connecting in common control electrodes of said field effect transistors for transfer; capacitor elements, one end of each capacitor element being connected to the second main electrode of said each field effect transistor for transfer of a charge thereon; transfer auxiliary pulse input lines connecting in common the other ends of said capacitor elements; horizontal switching elements having first and second main electrodes, each switching element having a first electrode connected to the second main electrode of each field effect transistor for each column; a video input line connecting in common the second main electrodes of said horizontal switching elements; and a horizontal scan pulse input line connected in common to the control electrodes of said horizontal switching elements.

4. An electric charge transfer apparatus according to claim 3, further comprising means for applying when the signal electric charge is transferred to the video output line a transfer pulse to said transfer pulse input line before the application of a transfer auxiliary pulse to said transfer auxiliary pulse input line.

5. An electric charge transfer apparatus for transferring a fluctuating electric charge, said charge having a magnitude controlled by the amount of incident light received by a detector comprising: a capacitance element storing said electric charge, read means for detecting the electric charge on said capacitance element fluctuated in accordance with the radiation of light, and an auxiliary capacitance element provided between said capacitance element and said read means, said auxiliary capacitance element supplying a bias electric charge to said capacitance element, said bias electric charge improving the efficiency of charge transfer from said capacitance element to said read means.

6. An electric charge transfer apparatus according to claim 5, having means for providing an electric charge transfer cycle, said cycle comprising supplying the bias electric charge from said auxiliary capacitance element to said capacitance element, subsequently transferring the fluctuated electric charge and the bias electric charge back to said auxiliary capacitance element, and subsequently introducing only the fluctuated signal electric charge from said auxiliary capacitance element to said read means.

7. An electric charge transfer apparatus according to claim 6 which constitutes a semiconductor integrated circuit.

8. An electric charge transfer apparatus according to claim 5 wherein the combination of said capacitance element and a photoelectric converter element provides a semiconductor light image detecting means of a light image detecting apparatus of an electric charge transfer type.

* * * * *